June 2, 1931.   J. A. BOUSH   1,807,619
FLOATING BULB EDGE GLASS TRIMMER
Filed July 26, 1929   3 Sheets-Sheet 3
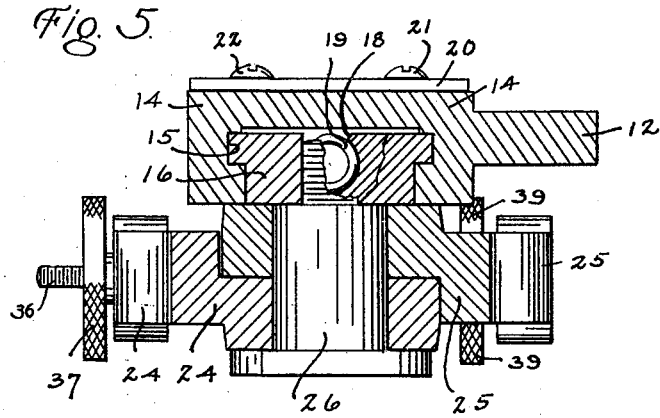
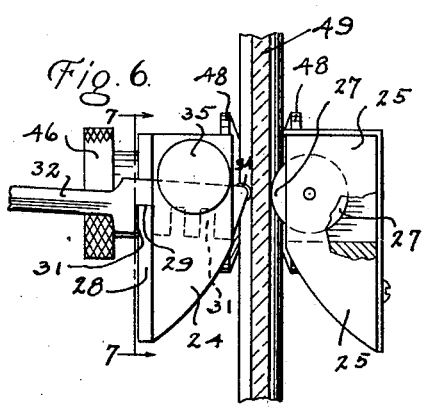
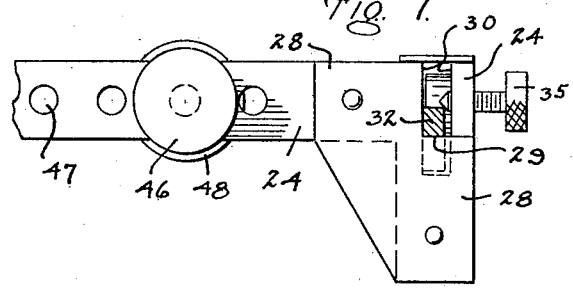
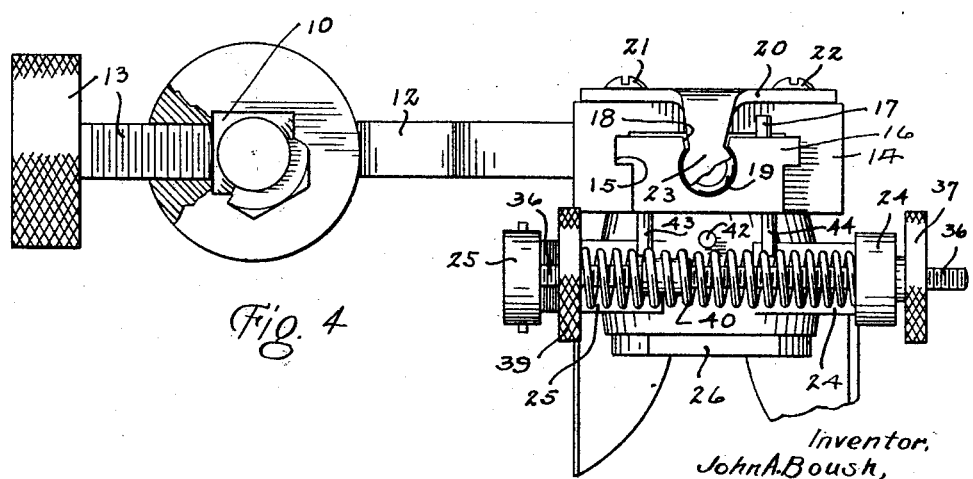
Inventor,
John A. Boush,
By Minturn & Minturn
Attorneys.

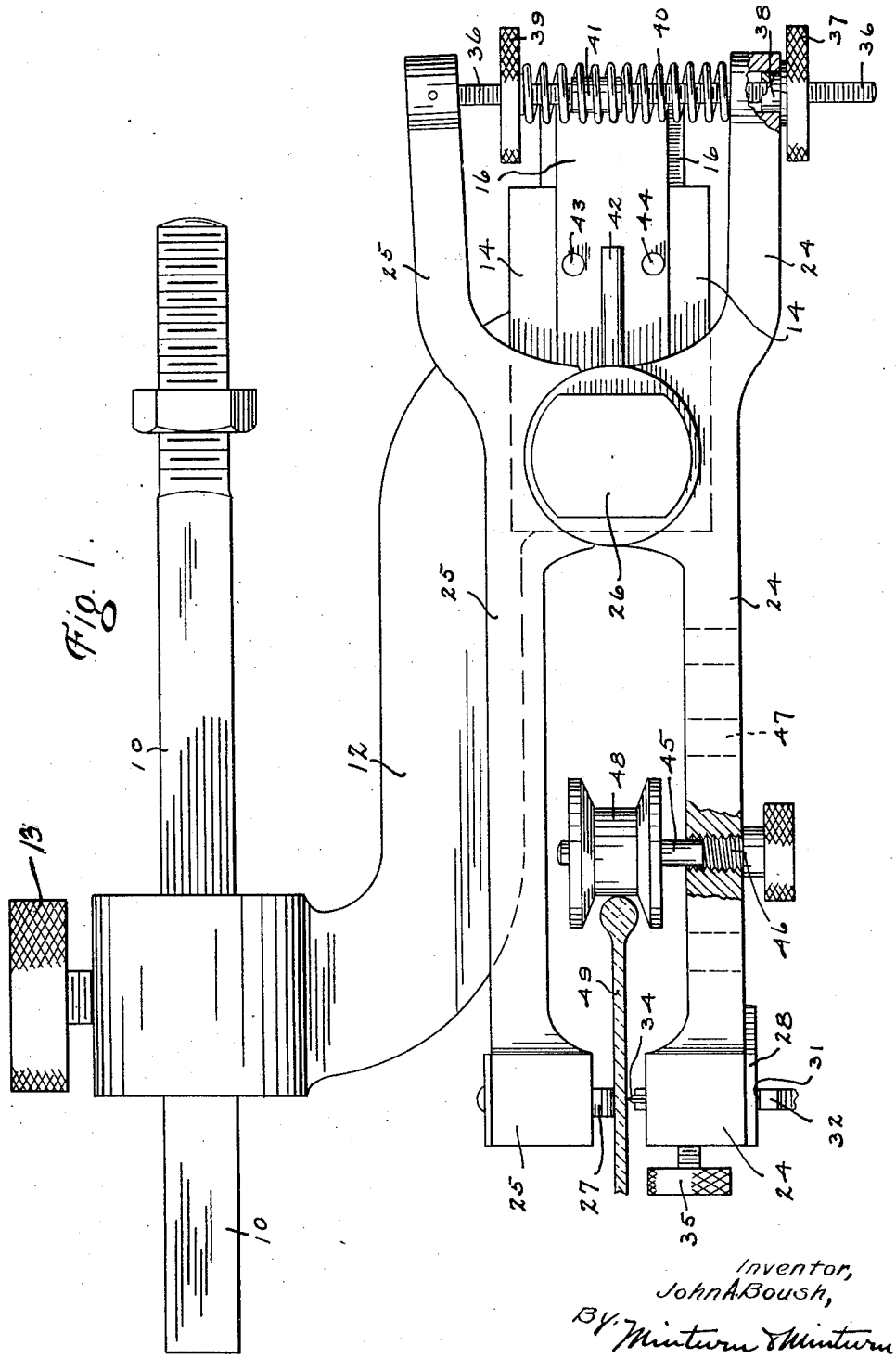

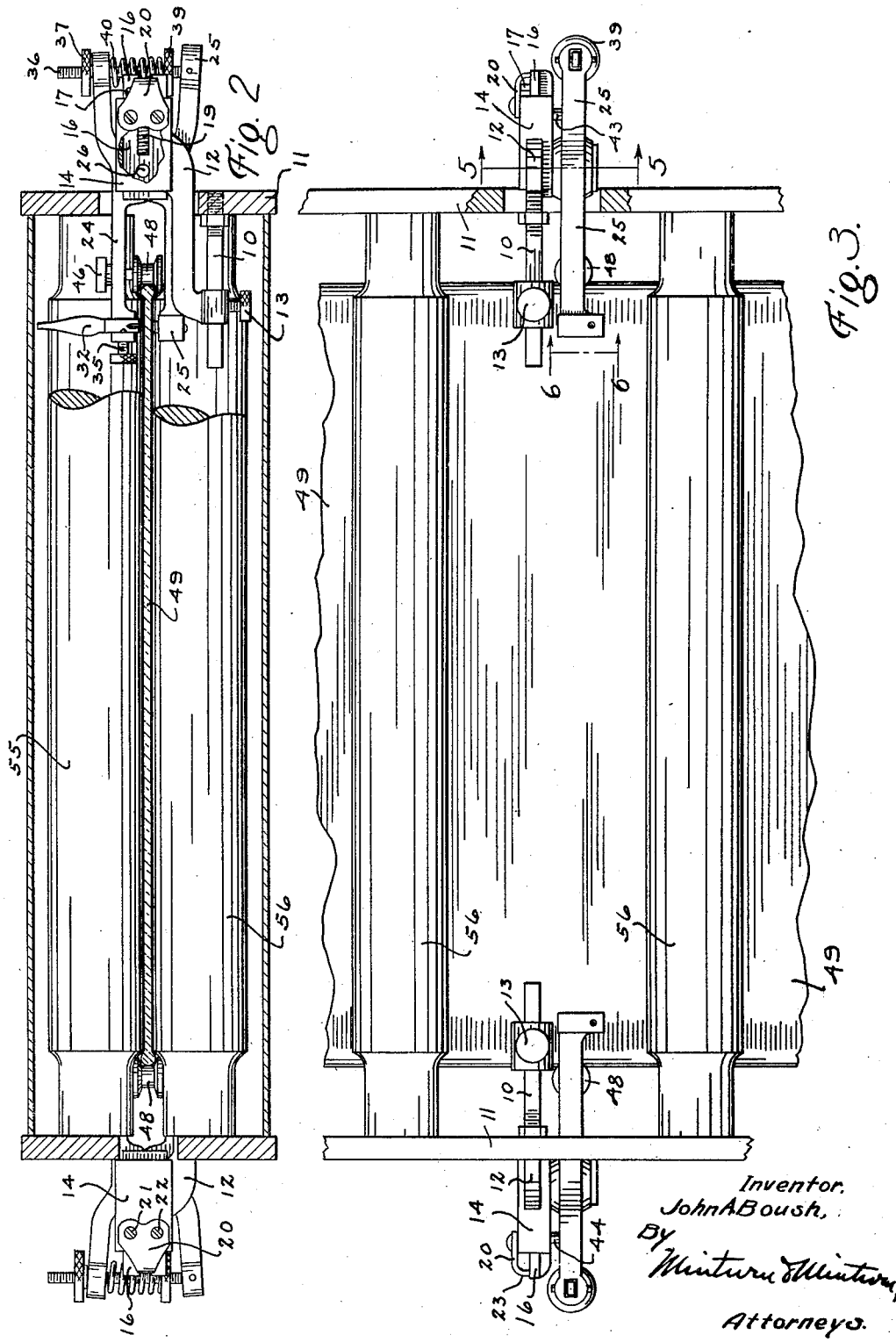

Patented June 2, 1931

1,807,619

UNITED STATES PATENT OFFICE

JOHN A. BOUSH, OF VINCENNES, INDIANA, ASSIGNOR TO BLACKFORD WINDOW GLASS COMPANY, OF VINCENNES, INDIANA, A CORPORATION OF INDIANA

FLOATING BULB EDGE GLASS TRIMMER

Application filed July 26, 1929. Serial No. 381,131.

This invention relates to the art of cutting glass and particularly to means for cutting a sheet of moving glass longitudinally of its direction of travel. While the invention has a number of applications it is herein described in one particular adaptation to the continuous process of drawing sheet glass known as the Fourcault process wherein sheet glass is drawn continuously in a vertical plane from a tank of molten glass.

In this process the glass carries edges that are usually bulb edged and in order to prepare the glass for rapid cutting into sizes, it is of great advantage as to saving of time as well as to have the edges as they come through the drawing machine actually trimmed so that as the glass leaves the drawing mechanism, the glass will have edges uniformly cut and have exactly parallel sides.

It is the primary object of the invention to provide a trimming or cutting device that will cut the sheet glass to a uniform width to have parallel sides or to remove a definite width of glass along the edges of the sheet to preserve the bulb edge therewith.

Other objects reside in the provision of a trimming or cutting device so constructed that it will automatically take care of inequalities in width and at the same time adjust itself automatically to any variation in thickness and surface contour in relation to a cutting tool.

Further objects reside in producing such a cutting device in a simple positive acting form that may be extremely durable over a period of time and that may be readily attached and detached to and from glass drawing machines already built.

These and other objects will become apparent in the following description of the invention as illustrated by the accompanying drawings, in which—

Fig. 1 is a bottom plan view of the device embodying the invention;

Fig. 2, a transverse horizontal section through a glass drawing machine showing the invention operatively applied thereto;

Fig. 3, a fragmentary vertical elevation of the glass drawing machine as shown in Fig. 2;

Fig. 4, a rear elevation of the device as shown in Fig. 1;

Fig. 5, a vertical section on the line 5—5 in Fig. 3;

Fig. 6, a vertical section on the line 6—6 in Fig. 3; and

Fig. 7, a vertical section on the line 7—7 in Fig. 6.

Like characters of reference indicate like parts throughout the several views in the drawings.

I provide a supporting stud 10 which may be screw-threadedly held in a horizontally disposed position by a vertical member 11 of the glass machine, Fig. 2. A bracket 12 has an end adapted to slidingly engage the projecting end of the stud 10 and the stud 10 is here shown square in cross section to prevent the bracket 12 from rocking therearound. The bracket 12 may be adjusted longitudinally of the stud 10 and secured at and desired position therealong by turning the thumb screw 13 compressively against the stud 10, the screw being screw-threadedly passed through the bracket 12 as indicated in Fig. 4. The bracket 12 is formed to have a portion substantially parallel to the stud 10 and carries on its outer free end a head 14 from the under side face of which is cut a T-slot 15 to slidingly receive therein the block 16 (see Fig. 5).

This block 16 is free to slide in a direction parallel to the stud 10 within the slot 15 of the block 16. A pin 17 is secured in the block 16 to project upwardly therefrom so as to limit the travel of the block 16 through the head 14 in the direction of that end of the bracket 12 which is carried on the stud 10. On the top side of the block 16 is a longitudinal groove 18 positoned longitudinally of the block and communicating with a cylindrical bore therebelow in which is carried a compression spring 19. The forward end of the bore terminates within the block 16 while the rear end opens through the back side of the block. On top of the block, a plate 20 is attached thereto by the screws 21 and 22 and a downwardly projecting finger 23 extends thru the slot 18 and into the bore to have the rear end of the spring 19 compressively in contact therewith so that by reason of the pressure of the spring 19, the block 16 is normally urged within the head 14 to have the pin 17 arrest further travel by contacting the rear face of the head. The block 16 may of course be pulled rearwardly through the head 14 for a distance in overcoming the spring 19.

Referring principally to Fig. 1, a pair of scissor-like jaws 24 and are pivotally interconnected by the stud 26 which passes through both jaws and screw-threadedly engages in the block 16 ahead of the forward end of the spring 19. The jaw 25 has a roller 27 rotatably carried therein in a vertical plane transversely of the jaw near its outer end to project from its inner side toward the jaw 24. On the end of the jaw 24 on its outer side is positioned and secured thereto a plate 28 to present an upwardly projecting lip 29 across a slot 30 extending transversely across the end of the jaw 24 from its upper side.

This lip 29 is of a thickness that will just fit in and receive thereover the slot 31 of a glass cutter 32. The glass cutter 32 is formed in the manner well known to those versed in the art, having notches 31, and the cutting disc 34. The transverse width of the jaw 24 is such that the disc 34 of the cutter will extend beyond the inner side of the jaw and toward the roller 27. A thumb screw 35 screw-threadedly enters from the outside end of the jaw 24 and has a conical end adapted to strike the top side of the cutter 32 whereby drawing the screw thereagainst will securely seat the cutter over the lip 29 and securely hold it in that position.

The jaws 24 and 25 have short arms extending rearwardly in spaced apart relation from the stud 26. Fixed in the rear end of the short arm of the jaw 25 is a screw-threaded bolt 36, which bolt extends freely through the corresponding end of the arm of the jaw 24 and carries thereon from the outer-side the adjusting nut 37 which has a collar 38 integrally a part thereof to slidingly enter within the bore in the end of the jaw 24 through which the bolt 36 passes. Toward the arm of the jaw 25 a second adjusting nut 39 is screw-threadedly carried on the bolt 36 and a compression spring 40 is carried concentrically about the bolt 36 to compressively engage between the nut 39 and the inner face of the arm of the jaw 24. A stop collar 41 is secured on the bolt 36 at a point between the two arms of the jaws substantially equidistant therefrom when the jaws are in normal operating positions.

A pin 42 horizontally projects rearwardly from the jaw 24, and from the underside of the block 16 the pins 43 and 44, spaced apart one from the other, project downwardly to have the pin 42 extend horizontally therebetween.

The purpose of the pin 42 is to limit the amount of rotation of the jaws 24 and 25 about the stud 26 by means of the pin 42 being stopped in either direction upon contact with the pins 43 and 44 as the case may be.

The arm 24 is provided with a plurality of holes 47 horizontally therethrough to receive selectively therealong the pin 45 which projects from the thumb screw 46 screw-threadedly engaging within the holes 47. A spool 48 is rotatably carried on the pin 45 and the length of the pin 45 between the jaws 24 and 25 is such that the cutter disc 34 may actually contact the roller 27, or at least approach one another close enough to compressively engage therebetween a sheet of glass 49 before the end of the pin 45 may contact the inner face of the opposing jaw 25.

When a length of glass is to be cut to have parallel longitudinal edges, two of the cutting devices, as above described, are employed, one on each edge of the glass 49, Figs. 2 and 3, and in that case, the spools 48 are removed by withdrawing the screws 46. By adjusting the brackets 12 along the studs 10, the two cutters may be spaced apart one from the other to give the desired glass width therebetween, and as the glass is drawn upwardly by the rollers 55 and 56 of the drawing machine with edges between the jaws 24 and 25, the spring 40 holds the cutter disc 34 against the glass 49 with the roller 27 bearing against the glass with equal pressure from the opposite side. The jaws 24 and 25 may spread apart to overcome the spring 40 should an increased thickness of glass pass between the cutter and roller and then return to their normal positions upon the original thickness of glass being presented. Also, should the glass be wavy, the jaws 24 and 25 may follow the glass in unison by rocking about their common pivot stud 26, without interfering with the cutting operations.

When lengths of glass uniform in width and having bulb edges are desired, the spools 48 are positioned on the jaws 24 to be spaced at the right hole 47 removed from the cutter disc 34 to permit the desired width of glass to be cut. The brackets 12 are adjusted along their studs 10 to have the spools 48 initially compressively contact the edges of the glass 49 through pressure of the springs 19, the pins 17 being carried back out of contact with the head 14 as the brackets 12 are moved toward the glass edges as the blocks 16 are pushed outwardly thereby.

It is obvious that, as the edges of the glass 49 may depart from a straight line, the spools 48 will remain in contact therewith by reason of the springs 19 carrying the spools thereagainst, and that, as the spools advance and retreat to follow the glass edges, the cutter disc 34 follows likewise at a fixed uniform distance therefrom to cut a strip from each side of the glass 49 exactly of the same width through its length regardless of the departure of the outer bulb edges from straight lines.

While I have here shown and described the invention in the one form as now best known to me, it is obvious that many structural changes or deviations may be made therefrom without departing from the spirit of the invention, and I, therefore, do not desire to be limited to that precise form, now any more than may be required by the following claims.

I claim:

1. In a device for cutting glass, a cutter, means for holding the cutter, means for yieldingly pressing the cutter against the glass, supporting means, said holding and said pressing means being carried by said supporting means, said holding means being movably carried by the supporting means to permit travel thereof both laterally and normally of the glass, and spring means resisting lateral movement of said holding means away from said glass, and a stop limiting the travel of the holding means.

2. In a device for cutting glass, a cutter, means for holding the cutter, means for yieldingly pressing the cutter against the glass, supporting means, said holding and said pressing means being carried by said supporting means, said holding means being movably carried by the supporting means to permit travel thereof both laterally and normally of the glass, and spring means resisting lateral movement of said holding means away from said glass, and a stop limiting the travel of the holding means, a spool adapted to contact the edge of said glass, said spool being carried by said holding means and spacing the cutter from the edge of said glass.

3. In a glass edge trimmer, the combination of a pair of arms between which the glass passes, a glass cutter carried by one arm, a roller carried by the other arm opposite the cutter and means for yieldingly moving the arms toward the glass, whereby a line is defined by the cutter over the glass during relative travel between the glass and the cutter, and means for automatically maintaining said cutter a definite distance from the edge of the glass whereby a strip having a cut edge parallel to the outer edge may be cut from the glass.

4. In a glass edge trimmer, means for directing glass in a uniform line of travel, an arm projecting laterally toward the glass, a glass cutter carried by the arm carrying a cutting tool directed toward the glass, a second arm, a roller carried opposite the cutter by the second arm, arm supporting means removed from the path of the glass, both of said arms, being rockably carried in respect to the supporting means and yieldingly extensible over the glass therefrom, and said cutter being yieldingly pressed toward its glass by said arm.

5. In a glass edge trimmer, means for directing glass in a uniform line of travel, an arm projecting laterally toward the glass, a glass cutter carried by the arm carrying a cutting tool normally engaging the glass, arm supporting means removed from the path of the glass, said arm being rockably carried in respect to the supporting means and adjustably extensible over the glass therefrom, a spool carried by the arm and adapted to contact an edge of the glass and spring means adapted to move said arm to maintain said spool in yielding contact with the glass edge whereby the arm may advance and recede in accordance with variations of the glass edge from a straight line during travel of the glass past the cutter.

6. In a glass edge trimmer, means for directing glass in a uniform line of travel, an arm projecting laterally toward the glass, a glass cutter carried by the arm carrying a cutting tool normally engaging the glass, arm supporting means removed from the path of the glass, said arm being rockably carried in respect to the supporting means and yieldingly retractible from over the glass theretoward a second arm, rockably carried in relation to the first arm, a glass contacting member carried by the arm adapted to contact the glass from the side opposite to that contacted by said cutting tool, and means for rocking said second arm to maintain said member in yielding compressive contact with the glass.

7. In a glass edge trimmer, a supporting head, a block slidingly carried by the head, a pair of arms pivotally carried by the block, a glass cutter carried by one of said arms, a roller carried by the other of said arms opposite said cutter, means for yieldingly swinging the arms one toward the other, and means yieldingly urging said block in one direction of its travel and a stop means.

8. In a glass edge trimmer, a supporting head, a block slidingly carried by the head, a pair of arms pivotably carried by the block, a glass cutter carried by one of said arms, a roller carried by the other of said arms opposite said cutter, means for yieldingly swinging the arms one toward the other, and means yieldingly urging said block in one direction of its travel, and a glass edge contacting spool held by and between said arms spaced from said cutter.

9. In a glass edge trimmer, a supporting head, a block slidingly carried by the head, a pair of arms pivotably carried by the block, a glass cutter carried by one of said arms, a roller carried by the other of said arms opposite said cutter, means for yieldingly swinging the arms one toward the other, and means yieldingly urging said block in one direction of its travel, a mounting post, and a bracket carrying said head and adjustably fixed on said post.

10. In a glass edge trimmer, a supporting head, a block slidingly carried by the head, a pair of arms pivotably carried by the block, a glass cutter carried by one of said arms, a roller carried by the other of said arms opposite said cutter, means for yieldingly swinging the arms one toward the other, means yieldingly urging said block in one direction of its travel, and means limiting the rotation of said arms about said block.

11. In a glass edge trimmer, a supporting head, a block slidingly carried by the head, a pair of arms pivotably carried by the block, a glass cutter carried by one of said arms, a roller carried by the other of said arms opposite said cutter, means for yieldingly swinging the arms one toward the other, means yieldingly urging said block in one direction of its travel, said arm swinging means comprising a spring adjustably fixed between said arms, and said block urging means comprising a stop on the block and a spring urging said stop against said head whereby said block may be moved in the opposite direction against the force of said spring.

In testimony whereof I affix my signature.

JOHN A. BOUSH.